United States Patent
Mao et al.

(10) Patent No.: US 7,151,654 B1
(45) Date of Patent: Dec. 19, 2006

(54) TMR HEAD STRUCTURE WITH CONDUCTIVE SHUNT

(75) Inventors: Sining Mao, Savage, MN (US); Janusz Josef Nowak, Eden Prairie, MN (US); Eric Shane Linville, Chanhassen, MN (US); Horng-Shiong Shawn Chen, Minneapolis, MN (US); Song S. Xue, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 202 days.

(21) Appl. No.: 10/300,412

(22) Filed: Nov. 19, 2002

Related U.S. Application Data (60) Provisional application No. 60/363,739, filed on Mar. 12, 2002.

(51) Int. Cl.
*G11B 5/39* (2006.01)
(52) U.S. Cl. .................................. 360/324.2
(58) Field of Classification Search ............... 360/323, 360/324, 324.1, 324.11, 324.12, 324.2
See application file for complete search history.

(56) References Cited

U.S. PATENT DOCUMENTS

| | | | |
|---|---|---|---|
| 1,800,454 A | | 4/1931 | Kolster |
| 4,317,149 A | | 2/1982 | Elser et al. |
| 5,428,491 A | * | 6/1995 | Smith .................... 360/327.31 |
| 5,465,186 A | | 11/1995 | Bajorek et al. |
| 5,491,605 A | | 2/1996 | Hughbanks et al. |
| 5,757,591 A | | 5/1998 | Carr et al. |
| 5,784,224 A | * | 7/1998 | Rottmayer et al. ......... 360/324 |
| 5,834,952 A | | 11/1998 | Ngo |
| 5,852,521 A | | 12/1998 | Umeyama et al. |
| 5,877,933 A | | 3/1999 | Johansen et al. |
| 5,880,912 A | * | 3/1999 | Rottmayer .................. 360/324 |
| 6,005,753 A | * | 12/1999 | Fontana et al. .......... 360/324.2 |
| 6,067,220 A | * | 5/2000 | Ahmann et al. ............ 361/111 |
| 6,256,178 B1 | * | 7/2001 | Gill .......................... 360/324.2 |
| 6,400,534 B1 | | 6/2002 | Klaassen |
| 6,424,505 B1 | * | 7/2002 | Lam et al. .................... 360/323 |
| 6,507,466 B1 | * | 1/2003 | Hayashi et al. ............. 360/323 |
| 6,512,660 B1 | * | 1/2003 | Li et al. ..................... 360/324 |
| 6,538,857 B1 | * | 3/2003 | Doss et al. ................. 360/323 |
| 6,667,860 B1 | * | 12/2003 | Granstrom et al. ......... 360/323 |
| 6,667,862 B1 | * | 12/2003 | Zhu ....................... 360/324.12 |
| 6,704,173 B1 | * | 3/2004 | Lam et al. .................... 360/323 |
| 6,717,780 B1 | * | 4/2004 | Hiramoto et al. ......... 360/324.2 |
| 6,728,082 B1 | * | 4/2004 | Tabat et al. .................. 360/323 |
| 6,738,235 B1 | * | 5/2004 | Mao ........................... 360/324 |
| 6,891,702 B1 | * | 5/2005 | Tang .......................... 360/323 |
| 6,914,758 B1 | * | 7/2005 | Ryan et al. .................. 360/323 |
| 6,972,933 B1 | * | 12/2005 | Wada et al. ................. 360/323 |
| 2002/0075611 A1 | * | 6/2002 | Seigler et al. .............. 360/324 |
| 2003/0206380 A1 | * | 11/2003 | Seigler et al. .............. 360/324 |

FOREIGN PATENT DOCUMENTS

EP  97307830.3  3/1995

\* cited by examiner

Primary Examiner—Angel Castro (57) ABSTRACT

The sensor of the present invention is a tunneling magnetoresistive read sensor that includes first and second electrodes, and a stack positioned between the electrodes. The stack includes at least one sense layer and a tunnel barrier. A shunt member is operatively coupled to the electrodes in parallel with the stack. The shunt member diverts current flowing from the first electrode to the second electrode when the sensor is operational so that current simultaneously flows through the stack and the shunt member to reduce the effective resistance of the sensor.

19 Claims, 4 Drawing Sheets

TMR HEAD STRUCTURE WITH CONDUCTIVE SHUNT

RELATED APPLICATIONS

This application claims priority of U.S. provisional application Ser. No. 60/363,739, entitled "TGMR Head Structure With Conductive Shunt Element" filed Mar. 12, 2002.

FIELD OF THE INVENTION

This application relates generally to magnetic transducers for reading information bits from a magnetic medium, and more particularly to an improved structure for a tunneling magneto-resistive (TMR) read head.

BACKGROUND OF THE INVENTION

A magneto-resistive (MR) element exhibits a change in electrical resistance as a function of external magnetic field. Such property allows MR elements to be used as magnetic field sensors, read heads in magnetic storage systems, and magnetic random-access-memories. In storage systems, the read head reads encoded information from a magnetic storage medium, which is usually a disc coated with a magnetic film. In a read mode, a magnetic bit on the disc modulates the resistance of the MR element as the bit passes below the read head. The change in resistance can be detected by passing a sense current through the MR element and measuring the voltage across the MR element. The resultant signal can be used to recover data from the magnetic storage medium. Depending on the structure of a device, the MR effect can fall into different categories, namely, anisotropic MR (AMR), giant MR (GMR), tunneling MR (TMR), and colossal MR (CMR).

As the areal densities of a hard disc increase beyond about 10 Gbit/inch$^2$, AMR heads give way to GMR heads due to a GMR head's ability to produce a stronger signal. The GMR device currently manufactured in production by the data storage industry is the spin valve. The spin valve consists of a free layer whose magnetization rotates with an external field, a non-magnetic metallic spacer layer (typically a Cu spacer or the like), a reference layer, a thin non-magnetic metallic layer (typically Ru), a pinned layer, and an antiferromagnetic pinning layer, such as PtMn or NiMn. The pinned layer has its magnetization direction fixed by virtue of the interfacial exchange coupling between the magnetization of the pinned layer and the antiferromagnet. The magnetization of the reference layer is in a direction anti-parallel to that of the pinned layer magnetization by virtue of the very strong antiferromagnetic coupling promoted between the pinned and reference layers by the thin non-magnetic metallic layer. In a typical spin valve, the current flows in the plane of the metallic layers. This mode of operation is referred to as current-in-plane (CIP). The electrical resistance of a spin valve is a function of the angle between the magnetization of the free layer and of the reference layer. A sensor exhibits the largest resistance when the two layers are magnetized in antiparallel directions, and the smallest when they are parallel. The technology of GMR read heads has advanced so that it is possible to read from areal densities up to 100 Gbit/inch$^2$, beyond which point the sensitivity and output signal again becomes an issue.

One possible solution to the limitations of spin valve heads is to use tunneling magnetoresistance (TMR) junctions. The typical TMR junction is very similar to a spin valve in the sense that it also includes a free layer, a spacer, and a synthetic antiferromagnet. However, an alternative design may include a spacer layer positioned between two free layers. The free layers are biased by some external source such that their magnetization is aligned in a perpendicular orientation.

A major difference between TMR junctions and spin valves is that in the TMR junction the spacer layer is an oxide or semiconductor barrier as opposed to a conductor. Moreover, the electrical current in a TMR junction flows perpendicular to the plane of the films (CPP mode) as opposed to flowing in the plane for spin valve sensors (CIP mode). Since the spacer layer is an insulator or semiconductor in a tunnel junction, the electrons making up the current travel ("tunnel") through the barrier from the free layer to the reference layer. The magneto-resistance of a TMR head changes due to the angular difference between the magnetization in the two magnetic layers in a way analogous to a spin valve. However, a TMR signal can be much larger than in spin valves, resulting in more amplitude and sensitivity of the device.

Due to the unique nature of tunneling physics and the CPP current flow, TMR junctions offer more room for engineering design because the TMR signal and resistance are not directly related, as they are in spin valves. In particular, the resistance of the junction depends only on the barrier thickness and junction area and not on the details of the rest of the stack. In theory, the magneto-resistance of a TMR junction depends only on the polarization of the free and reference layers and is independent of the junction area and the details of the other layers in the stack. In practice, for ultra-thin barriers, there is a strong dependence on magnetoresistance as a function of barrier thickness due to processing defects in the barrier. The most common defects are known as pinholes. Pinholes represent very small discontinuities in the tunneling barrier where the free and pinned layers are in direct contact with the tunneling barrier. The current can shunt through these pinholes and reduce the resistance and magnetoresistance of the stack. In spite of defect limitations, the CPP TMR provides tremendous flexibility in head design, allowing independent optimization of the individual layers of the stack. Additionally, the geometry of the head can be optimized to achieve the best head performance without sacrificing head amplitude.

All types of MR elements typically include shields, such as a high permeability film like NiFe. The function of the shields is to protect sensors from the stray magnetic fields originating from all magnetic bits on the medium, except the bit just underneath the sensor. For spin valves, the shields are separated from the sensor by an insulator such as, for example, aluminum oxide or silicon dioxide. The insulator helps to prevent current from leaking into the shields in CIP mode. As the linear bit density of a memory medium track increases, the shield-to-shield spacing of a read sensor must be reduced to adequately screen the flux from adjacent bits.

Spin valves are not well suited for high linear density applications because the shield-to-shield spacing of a spin valve includes both the stack thickness and the thickness of the gaps. TMR junctions are well suited for very small shield-to-shield spacing since the current flows in CPP mode, thus eliminating the need for an insulator between the shields and the sensor. If the shields are used as electrodes to the tunnel junction, the shield-to-shield spacing consists of only the stack thickness. Therefore, tunnel junctions may be superior in some respects to spin valves for high linear density applications.

A further consideration when designing MR elements is the physical line width density in memory media. As the line width (track) density increases, the width of the sensor layers also becomes an issue as does shielding of stray magnetic fields originating from adjacent tracks.

Another issue related to sensor design is the effective resistance of the MR elements. MR system designs typically have a fixed upper limit on the amount of effective resistance the system can tolerate, both from a system perspective and frequency response. In TMR elements, the effective resistance increases as the thickness of the tunnel barrier increases and the area of the TMR junction decreases. Consequently, the standard approach is to make the barrier as thin as necessary to meet the target resistance for a given TMR area. The area of the TMR is given by the product of the track width and sensor height (typically measured in microns). The track width is fixed by the track density and decreases for increasing areal density. The sensor height is not constrained by medium bit geometry and is adjusted to achieve the optimum stability for the device.

The sensor height is typically about 0.5–1.5 times the track width. For example, a typical design for 105,000 tracks per inch would be a sensor width of 0.12 microns and a stripe height of 0.15 microns. If the target resistance of the sensor is 100Ω, the intrinsic barrier resistance multiplied by the area product (RA product) should be about 1.8 $\Omega \cdot \mu m^2$. This requires the film thickness of the barrier to be in the range of about 4–5 Å (for typical oxide barriers). Such a film thickness poses a tremendous challenge for manufacturability. Furthermore, the reliability of the TMR device is significantly impacted by the RA product, with less reliability associated with smaller RA products (or thinner barrier). Specifically, the electrostatic breakdown, electrostatic discharge (ESD) sensitivity, and thermal reliability are all impacted by the RA product, and a lower RA stack junction (barrier) is more prone to being damaged during the processing, assembling, and operating of the TMR heads. There are serous concerns about whether ultra low RA TMR junctions can meet the strict reliability criteria for use in hard drives produced for magnetic storage applications.

Accordingly, there is a need for a new TMR head structure in which the device resistance can be managed for very small junction area while simultaneously providing sufficient amplitude, signal-to-noise ratio, and reliability for long term operation in hard drives. The present invention provides a solution to this and other limitations, and offers other advantages over the prior art.

SUMMARY OF THE INVENTION

Against this backdrop, the present invention has been developed. The sensor of the present invention is a tunneling magneto-resistive read sensor that includes first and second electrodes, and a stack positioned between the electrodes. One example of the stack includes a free (sense) layer, a tunnel barrier (insulating or semiconducting layer), and a synthetic antiferromagnet, and a pinning layer. Alternatively, the stack may include two sense layers and a tunnel barrier positioned between the two sense layers. A shunt member is operatively coupled to the electrodes in parallel with the stack. The shunt member diverts current flowing from the first electrode to the second electrode when the sensor is operational so that current simultaneously flows through the stack and the shunt member to reduce the effective resistance of the sensor. Both the magnetoresistance and reliability of the sensor can be increased by making the tunnel barrier thicker than would typically be possible for a non-shunted sensor, while keeping the total sensor resistance substantially the same as in the non-shunted case.

A method of shunting a tunneling magnetoresistive read sensor includes the steps of forming a stack that includes a sense layer, a tunnel barrier, a synthetic antiferromagnet layer, and a pinning layer. In an alternative stack embodiment, the stack may include two sense layers and a tunnel barrier positioned therebetween. The stack is positioned between first and second electrodes, and the shunt member is connected to the electrodes in parallel with the stack. The shunt member diverts current flowing from the first electrode to the second electrode when the sensor is operational.

When applying the TMR read head to a storage system, the system includes a storage medium having a data surface with magnetic data stored in radial spaced data tracks. The system also includes a slider adapted to move across the data surface, a current source providing a sense current, a magnetoresistive sensor carried on the slider adapted to receive the sense current in a sense current direction substantially perpendicular to a direction of the data tracks and provide a readback signal, and readback circuitry adapted to receive the readback signal and responsively provide a data output. The sensor reads data from the data surface in response to variations in the magnetic field across the data tracks and provides the readback signal to the readback circuitry.

These and various other features as well as advantages which characterize the present invention will be apparent from a reading of the following detailed description and a review of the associated drawings.

DETAILED DESCRIPTION

Figure 1:
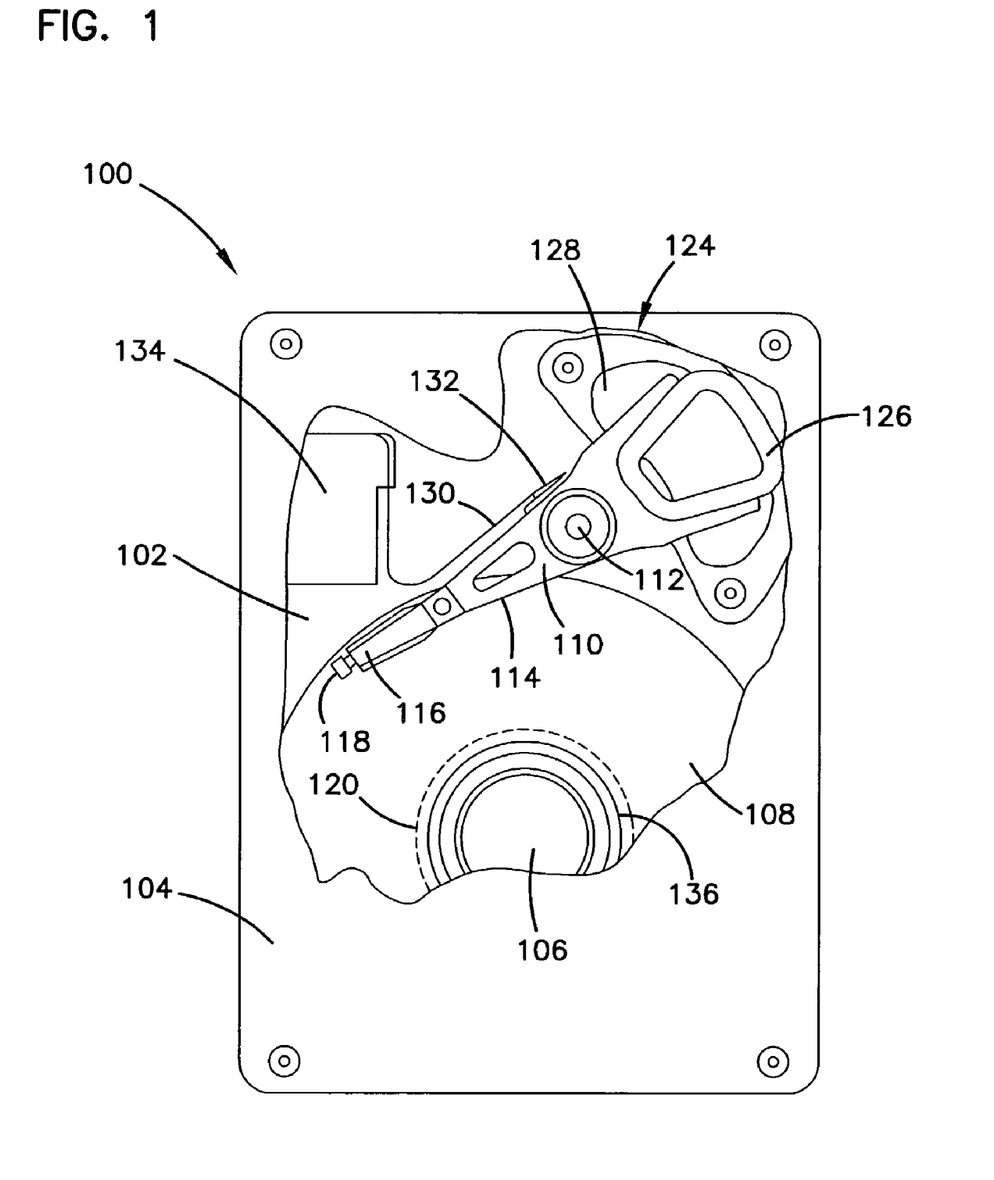
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108 to read from or write to tracks 136 on the disc.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
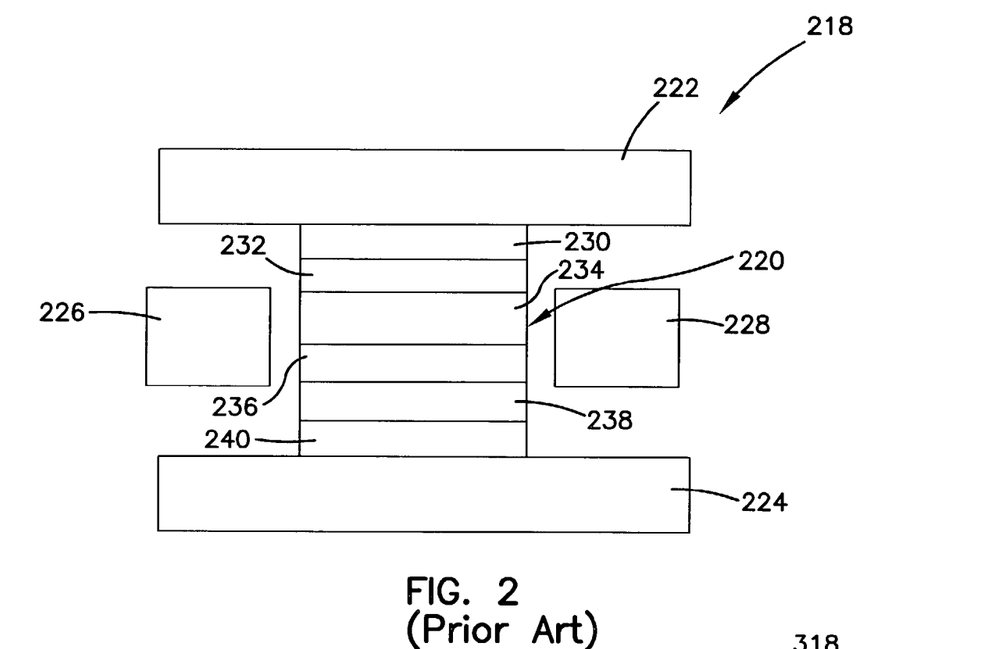
FIG. 2 is a schematic front view of a TMR read head of the prior art.

Referring now to FIG. 2, a basic design of a TMR head 218 of the prior art is schematically shown. Head 218 includes a TMR stack 220, a top shield 222, a bottom shield 224, and first and second permanent magnets 226 and 228. FIG. 2 illustrates head 218 from a front view, that is as viewed from the memory media surface or air bearing surface facing upward towards the head. Head 218 is aligned relative to a memory media track so that the direction in which the top shield, stack and bottom shield are aligned is parallel to a direction of the track.

Stack 220 includes a cap/contact layer 230, a free layer 232, an insulating or semiconducting tunnel barrier 234, a synthetic antiferromagnet 236, a pinning layer 238, and a seed/contact layer 240. Stack 220 is positioned between the top and bottom shields with the cap and seed layers contacting the top and bottom shields 222 and 224, respectively. The free layer 232 is separated from the synthetic antiferromagnet 236 by the tunnel barrier layer 234. The pinned layer portion of the synthetic antiferromagnet 236 has a magnetization that is pinned in a fixed orientation in the same plane as the pinning layer 238 magnetization, while a reference layer portion of the synthetic antiferromagnet 236 has its orientation fixed 180 degrees to the magnetization orientation of the pinned layer portion. Permanent magnets 226 and 228 are positioned on opposite sides of stack 220 to fix the magnetization orientation of the free layer 232 parallel to a surface of a memory media from which the TMR head 218 is reading.

A primary advantage of the shunting effect of the present invention addresses the limitations associated with very thin tunnel barrier layers that are required to keep the head resistance within a range required for proper hard drive operation. A thin tunnel barrier layer is inherently less thermally reliable, has a lower breakdown voltage, and has an increased ESD sensitivity. Each of these disadvantages affects the sensitivity and both short and long term reliability of the read head in a negative way.

Adding the shunt element of the present invention allows for a thicker barrier while maintaining resistance of the head within the required range for a given design. A head with a thicker barrier addresses the limitations described above by enabling a higher signal, improving thermal reliability, increasing the breakdown voltage, and decreased ESD sensitivity. The higher signal is ultimately lost due to the shunting effect, but can be made comparable to a device with a thinner barrier if the final resistance targets are made similar by reducing the size and/or number of pinholes in the barrier. A higher breakdown voltage enables the head to be operated at a higher bias voltage, so that in principle the signal output from the shunted head may be larger than the output signal for a non-shunted head. These advantages are coupled with increased thermal reliability and decreased ESD sensitivity that may be provided by a thicker barrier layer.

A further advantage of a shunted head relates to manufacturing of the head. That is, the resistance and amplitude sigma's are reduced through shunting, thus providing a resistance sigma of the shunt element that is not significantly larger than that of TMR junction.

There are two basic types of shunting in an ultra low RA tunnel junction: intrinsic material defects in the tunnel barrier (pinholes) and extrinsic shunting during the junction definition process (such as metal re-deposition or ion mixing around the junction edges). This invention discloses a third method of shunting which is a controlled external shunt purposely inserted parallel to the junction stack during the manufacture of the tunnel heads to provide the advantages described above. The use of a controlled shunt element may be counterintuitive since a large amount of process engineering time is devoted to reducing the two basic types of shunting in TMR junctions, both of which are not easily controllable and may pose serious problems in manufacturing of the heads.

Figure 3:
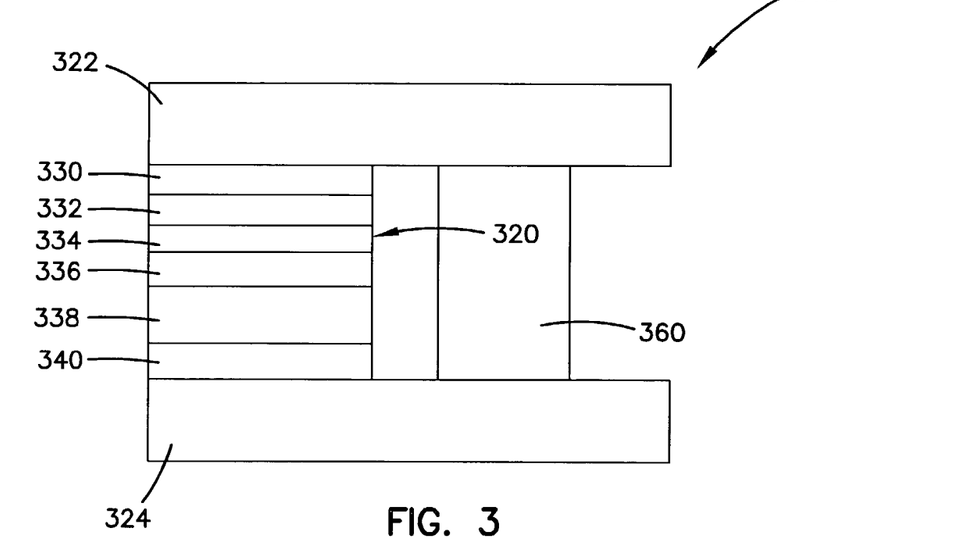
FIG. 3 is a schematic cross-sectional view of one example of a read head of the present invention having a shunt element in parallel with the stack.

FIG. 3 schematically illustrates a TMR head 318 that includes a carefully designed and integrated conductive shunt element 360 connected in parallel with a TMR stack 320. Head 318 includes cap and seed layers 330 and 340, a free layer 332, a tunnel barrier 334, a synthetic antiferromagnet 336, and a pinning layer 338. The shunt element 360 is intended to shunt a portion of the sensing current being passed between top and bottom shield members 322 and 324. By shunting a portion of the sensing current through shunt element 360, TMR head 318 is able to use a higher RA product stack and keep the total head resistance similar to a lower RA stack that is required when controllable shunting is not used.

Figure 4:
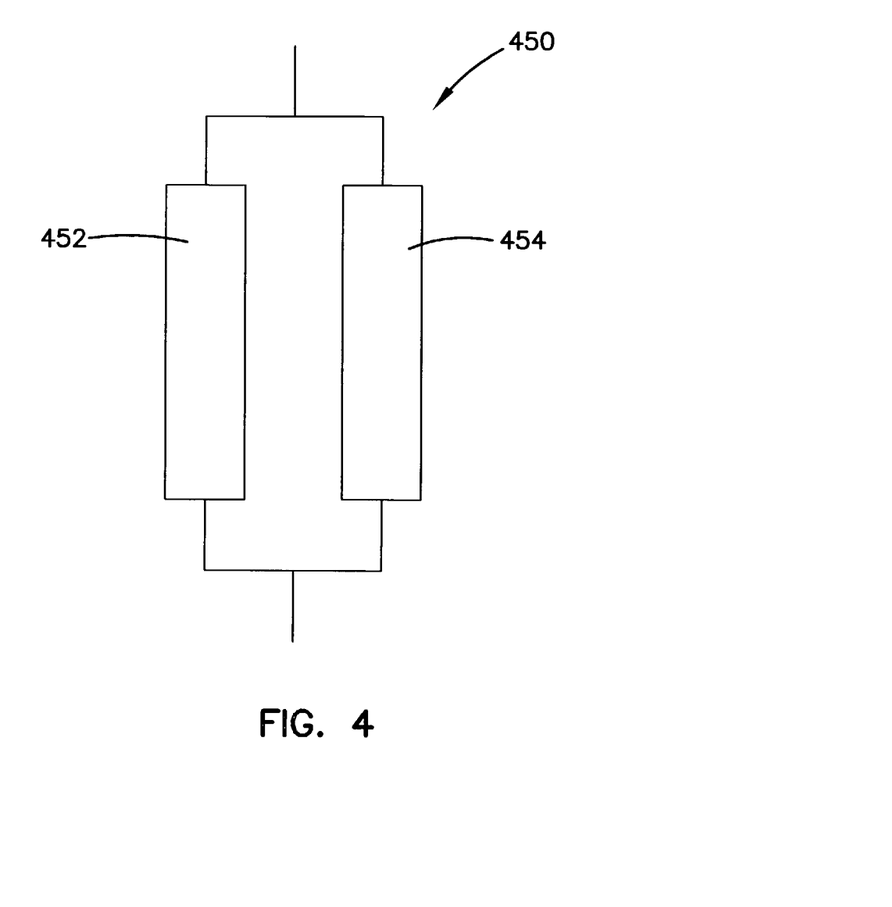
FIG. 4 is a schematic representation of the shunting effect of the shunt element of the present invention.

FIG. 4 schematically illustrates a simple parallel resistor model that is well established to describe this type of shunting effect. According to this model, an intrinsic tunnel junction resistance ($R_J$) 452 (which includes the pinhole effects in a barrier of a read head) is positioned in parallel with a resistance of a shunt element ($R_S$) 454. The shunt element is a carefully designed structure with resistive materials backfilled in a defined area, having a certain size and targeted resistance value. According to this model, the extrinsic shunting due to the junction definition process, as described above, is assumed to be negligible. However, if the extrinsic shunting were taken into effect, it would be combined in parallel with the intrinsic junction resistance to produce an effective resistance value of the junction $R_J$.

The total shunting factor of a read head is defined with the following equation:

$$\text{Shunting Factor} = \frac{R_S}{R_S + R_J} \qquad \text{Equation 1}$$

Figure 5:
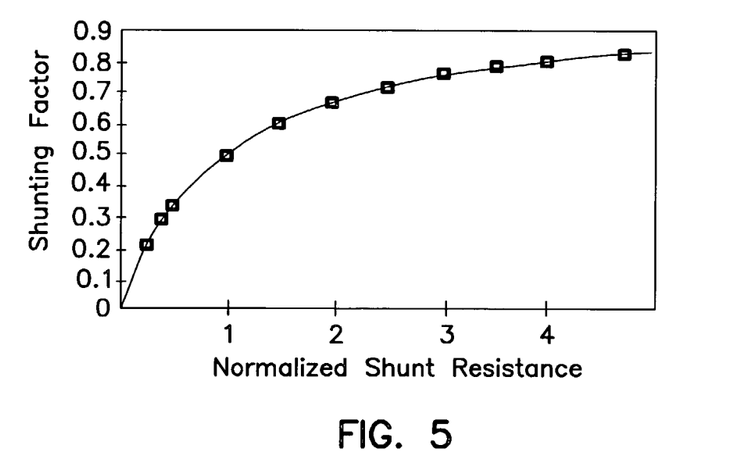
FIG. 5 is a graphical representation of the shunting factor of one embodiment of the present invention relative to a normalized shunt resistance.

FIG. 5 is a graph illustrating the relationship between the shunting factor and a shunt resistance normalized to the junction resistance. According to FIG. 5 and the above equation, if the intrinsic shunting resistance ($R_J$) and the shunting resistance $R_S$ are equal, (i.e. the normalized shunt resistance is 1) the shunting factor is 0.5. Thus, half the current goes through the tunnel junction and half the current goes through the shunt element.

The total resistance of the TMR junction $R_J$ may be multiplied by the total shunting factor to produce an effective resistance ($R_E$) of the TMR head, which is the resistance seen by the system. This allows one to design for a higher RA product from the tunnel stack by depositing a thicker barrier, and then multiplying this resistance by the corresponding shunting factor to obtain the designed system resistance.

When determining an effective TMR ratio (used to determine an output signal amplitude of the head), assume first that an intrinsic TMR ratio of the tunnel junction is given by $TMR_I$ (including the effects of pinholes). The effective TMR ratio ($TMR_E$) can then be approximated by the following equation:

$$TMR_E \approx TMR_I \cdot (\text{shunting factor}) = \left(\frac{\Delta R}{R_J}\right) \cdot (\text{shunting factor}). \qquad \text{Equation 2}$$

In this equation, the change in resistance of the TMR head ($\Delta R$) is the maximum resistance change obtained from the difference in resistance between the antiparallel and parallel orientations of the free layer with respect to the reference layer. As long as the TMR signal is less than about 25%, which is currently true for most ultra-low RA junctions, the error in this equation is typically less than about 10%.

The above $TMR_E$ equation establishes that there may be a reduction in effective TMR signal for a corresponding benefit of reducing the device resistance. This relationship is true because a portion of the current is diverted through the shunt resistor and does not contribute to the output signal of the device. Also, for ultra-low RA junctions, the intrinsic TMR signal (ratio) of the barrier ($TMR_I$) is intrinsically shunted by pinhole defects in the barrier. The number of pinholes increases for thinner barriers ("thinner" being defined as being in the range of 4–8 Å). By increasing the thickness of the barrier, the number of pinholes is decreased and the intrinsic TMR ratio increases. The decrease in pinholes provided by a thicker barrier, as well as the other advantages of a thicker barrier listed above (e.g., higher signal and decreased ESD sensitivity), may provide the significant gains in reliability mentioned earlier.

In practical cases in the 1–2 $\Omega \cdot \mu m^2$ range, doubling the RA product can often result in doubling the TMR ratio output, primarily due to pinhole reduction from a thicker barrier. Thus, the effective TMR ratio of a shunted read head can be comparable to the intrinsic TMR ratio of a read head with a thin barrier and no shunting.

The effective TMR ratio discussed above may be used to calculate the output signal amplitude of the read head according to the following equation:

$$\text{Output Signal} = V_{bias} \cdot TMR \cdot \text{reader efficiency}. \qquad \text{Equation 3}$$

In this equation, $V_{bias}$, is the bias voltage applied to the head, TMR is the TMR ratio of the device, and the reader efficiency is the range of movement of the free layer during the reading of a bit transition from a media medium with respect to a maximum possible range of movement.

As mentioned previously, the bias voltage can be higher for a thicker barrier than is typically used for a thinner barrier. Therefore, it is possible for the output signal from a read head with shunting to be larger than the output signal from a read head without shunting, if the following condition is satisfied:

$$V_{bias-shunt} \cdot TMR_E > V_{bias-no\ shunt} \cdot TMR_I. \qquad \text{Equation 4}$$

In this equation, $V_{bias-shunt}$ is the bias voltage of the shunted head with the thicker barrier and $V_{bias-no\ shunt}$ is the bias voltage of a non-shunted head having a thinner barrier. The equation assumes that the reader efficiency remains the same.

The following example will help clarify the fundamental principles of the invention and the above referenced equations. The numbers used in this example are representative of actual experimental values. This example assumes that the head design requires a total read head resistance of 100Ω. The track density calls for 105,000 track per inch. This results in a physical reader width of about 0.12 μm. For simplicity, the sensor will be square shaped. This gives a stripe height of about 0.12 μm, resulting in an area of the reader of about 0.0144 μm². The RA product of the barrier to obtain the target resistance should then be (100Ω)(0.0144 μm²)=1.44 Ω·μm². A further assumption in this example is that the tunnel barrier thickness required to generate this RA product is about 4.5 Å, and due to the presence of many pinholes, the TMR ratio is about 6%. In addition, the breakdown voltage of the barrier for this thickness is assumed to be about 280 mV and the head will be assumed to operate at about 50% of the breakdown voltage. Further, the reader efficiency is assumed to be about 20% to ensure adequate stability. Given these parameter values, the head amplitude is calculated to be:

$$\text{Output Signal} = 280\ mV \cdot 0.5 \cdot 0.06 \cdot 0.2 = 1.68\ mV. \qquad \text{Equation 5}$$

If the tunnel barrier is assumed to have an RA product of 2.88 Ω·μm², and the reader is placed in parallel with a 200Ω shunt resistor, the read head will have an effective resistance of 100Ω, the same as the case of the non-shunted reader with an RA product of 1.44 Ω·μm². If the barrier thickness is assumed to be increased to 5.5 Å, pinholes are reduced due to the thicker barrier, the TMR output signal increases to about 12%, the breakdown voltage increases to about 350 mV, and the effective TMR signal (ratio) from the head remains at about 6% after shunting.

Given these parameter values for a shunted head, the output amplitude is given by:

$$\text{Output Signal} = 350\ mV \cdot 0.5 \cdot 0.06 \cdot 0.2 = 2.10\ mV. \qquad \text{Equation 6}$$

Thus, the shunted tunnel head results in an increased output signal, increased breakdown voltage, and increased reliability even though the effective head resistance is identical to that of the non-shunted head that has a thinner barrier. In addition, if it is assumed that the shunt resistance sigma of a large number of heads is not significantly larger than the resistance sigma of the intrinsic TMR, the effective resistance sigma of the parallel combination will be lower than the resistance sigma of the intrinsic barrier resistance. All of these factors promote improved manufacturability of the TMR head reader.

To summarize the results obtained in the example above, the variables of the above output signal equation may be dependent on different physical characteristics of the read head. For example, the bias voltage and TMR ratio are highly dependent on the thickness of the tunnel barrier. One advantage of the shunting element of the present invention is that the thickness of the tunnel barrier may be increased (thereby increasing the resistance of the stack) while maintaining the same effective resistance, due to the shunting element. As described above, a thicker TMR barrier may have certain advantages over thin tunnel barriers such as improved reliability, enhanced stability, and a lower probability of manufacturing defects, such as pinholes, that cause intrinsic shunting.

The shunting element of the present invention may have other effects on the system in addition to altering the effective resistance of the read head. Producing the shunting element from a soft magnetic material and positioning the shunting element adjacent to the free layer may also reduce the free layer self-demagnetization field. A lower free layer self-demagnetization field may result in a better free layer efficiency, which may, according to the above output signal equation, improve the output signal of the read head.

The shunt element 360 illustrated in FIG. 3 may be located in several positions relative to stack 320. For example, the shunt element 360 may be located on the rear side of the stack away from the memory media surface, or may be placed in other areas to serve the same functionality, such as on a side of the stack adjacent the memory media surface. For example, shunting element 360 may be positioned between shield elements 322 and 324 at any point in head 318 up to the position of the preamplifier of the disc drive assembly. Preferably, the shunt element 360 is positioned away from the head area and connected in parallel to the shields.

The shunt element 360 may be, for example, the semiconductor diode, a pure resistor, a nonlinear shunt (as with ESD protectors), or a soft magnetic material that serves as a free layer demagnetization balance element. In other embodiments, a separate shunt 360 may be integrated on a preamplifier chip of the disc drive with a tunable resistance range. The shunt may also be positioned on a separate chip coupled to a flex on suspension (FOS) interconnect.

The shunt element may be made of a number of different materials. For example, the shunt element may be composed of chrome, or a like metallic material having a sheet resistance such that the desired shunt resistance can be achieved efficiently with respect to the space available on the slider.

The shunting element described above with regard to read head 318 may be integrated into other TMR designs. For example, a TMR head 518, illustrated in FIG. 6, includes a shunting element 560 in parallel with a tri-layer stack 520 as shown and described in U.S. application Ser. No. 10/302,443 now U.S. Pat. No. 7,035,062 and which is herein incorporated by reference in its entirety. Stack 520 includes seed and cap layers 530 and 540, respectively, and a tunnel barrier 534 positioned between first and second free layers 532 and 542. Shunting element 560 shunts a portion of a current passing between top and bottom shield members 522 and 524.

Figure 6:
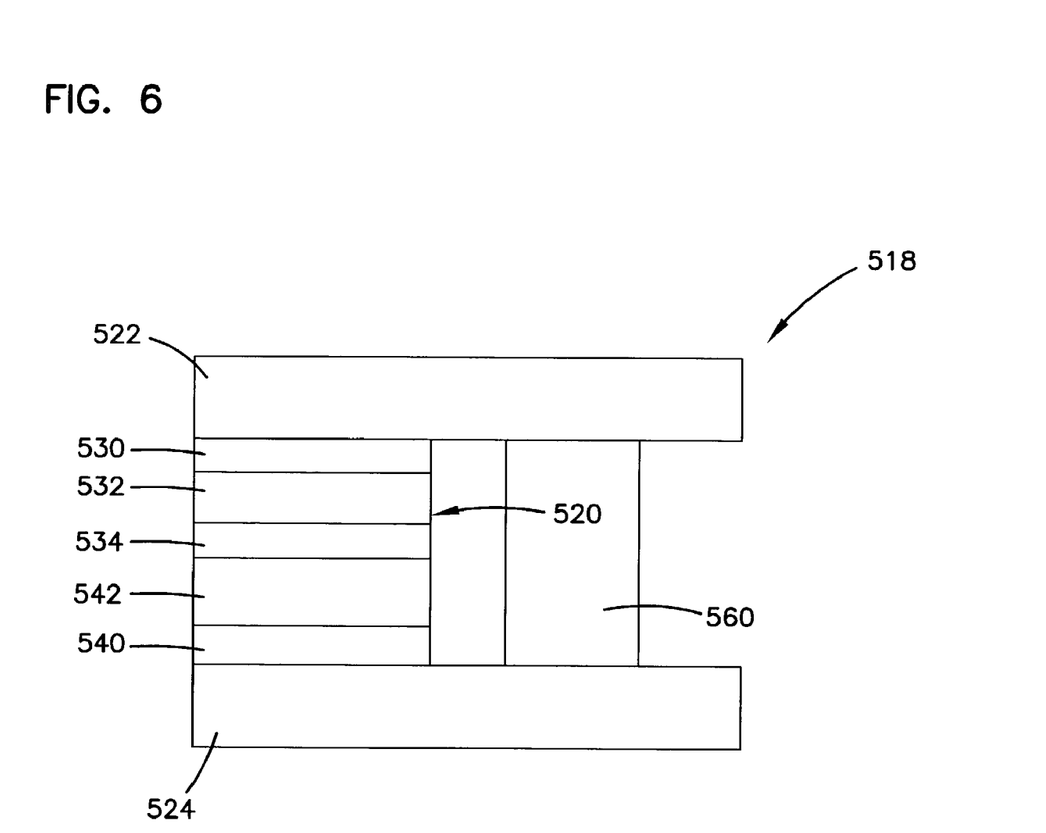
FIG. 6 is a schematic cross-sectional view of another example of a read head of the present invention having a shunt element in parallel with the stack.

Shunt element 560 may serve multiple purposes in this embodiment. For example, shunt element 560 may serve as both a shunting element between the shields as well as a permanent magnet or soft magnet that biases the magnetization orientation of the first and second free layers relative to each other. Because shunting element 560 is positioned at different locations relative to stack 520 (e.g., at a rear of the stack), there are advantages in improving the sensitivity and reliability of the read head 518, particularly as the shield-to-shield and linear track density requirements increase. Positioning the shunt at, for example, the rear of the stack may also provide space along the sides of the stack to allow additional shielding from stray magnetic flux emanating from adjacent tracks.

One example of a sensor of the present invention is the tunneling magnetoresistive read sensor 318 shown in FIG. 3 that includes first and second electrodes, and a stack positioned between the electrodes. The stack includes a free (sense) layer, a tunnel barrier, a synthetic antiferromagnet, and pinned layer. Another example of a sensor of the present invention is the TMR read sensor 518 shown in FIG. 6. Sensor 518 includes a stack that may include a tunnel barrier positioned between two free layers. A shunt member in each of sensors 318 and 518 is operatively coupled to the electrodes in parallel with the stack. The shunt member diverts current flowing from the first electrode to the second electrode when the sensor is operational so that current simultaneously flows through the stack and the shunt member to reduce the effective resistance of the sensor.

A method of shunting a tunneling magnetoresistive read sensor includes the steps of forming a stack positioned between first and second electrodes, and connecting a shunt member to the electrodes in parallel with the stack. The shunt member diverts current flowing from the first electrode to the second electrode when the sensor is operational.

When applying the TMR read head to a storage system, the system includes a storage medium having a data surface with magnetic data stored in radial spaced data tracks. The system also includes a slider adapted to move across the data surface, a current source providing a sense current, readback circuitry adapted to receive a readback signal and responsively provide a data output, and a magnetoresistive sensor carried on the slider adapted to receive the sense current in a sense current direction substantially perpendicular to a direction of the data tracks. The sensor reads data from the data surface in response to variations in the magnetic field across the data tracks and provides the readback signal to the readback circuitry. A shunt element is positioned in parallel with a stack of the sensor. The system includes means for passing current simultaneously through the stack and the shunt member to reduce an effective resistance of the sensor.

Ultimately, the shunt element described herein leads to a more reliable and sensitive read head that meets the increased demands of higher areal densities than currently known in the art.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A transducer comprising:
   a plurality of electrodes;
   a read sensor connected to the plurality of electrodes, wherein the read sensor has
   a first resistance value;
   a single layer shunt member connected to the plurality of electrodes in parallel with the read sensor, wherein the shunt member is structured to decrease the first resistance of the read sensor.

2. The transducer of claim 1, wherein the read sensor is a tunneling magnetoresistive sensor.

3. The transducer of claim 2, wherein tunneling magnetoresistive sensor has a plurality of layers, the plurality of layers including a free layer, a barrier layer, a synthetic anti-ferromagnet layer, and an antiferromagnetic layer.

4. The transducer of claim 3, wherein the synthetic antiferromagnet includes a reference layer coupled to a pinned layer through a layer of ruthenium.

5. The transducer of claim 1, wherein the read sensor comprises an air bearing surface and a permanent magnet positioned at a side of the read sensor opposite the air bearing surface to bias a magnetization orientation of at least one layer of the read sensor in a perpendicular orientation.

6. The transducer of claim 1, wherein the read sensor has an intrinsic resistance of approximately 100 ohms, and the shunt member has a resistance of approximately 200 ohms.

7. The transducer of claim 1, wherein the single layer shunt member consists essentially of a metal.

8. A method of shunting comprising the steps of:
   forming a read sensor;
   positioning the read sensor between a plurality of electrodes, the read sensor having an output signal;
   connecting a single layer shunt member to the plurality of electrodes in parallel with the read sensor; and
   selecting a resistance value for the shunt member that will decrease a resistance of the read sensor during operation.

9. The method of claim 8, further comprising directing a current through the plurality of electrodes, wherein the single layer shunt member diverts a portion of the current from the read sensor while the read sensor is operational.

10. The method of claim 8, wherein the read sensor includes an air bearing surface and a back surface opposite the air bearing surface, further wherein the single layer shunt member is positioned adjacent the back surface.

11. The method of claim 8, wherein the single layer shunt member consists essentially of metal.

12. The method of claim 8, wherein the single layer shunt member has a tunable resistance range.

13. The method of claim 8, wherein the single layer shunt member is positioned on a separate chip coupled to a flex on suspension interconnect.

14. The method of claim 8, wherein the read sensor is a tunneling magnetoresistive sensor.

15. A transducer comprising:
   at least two electrodes;
   a read sensor coupled to the at least two electrodes; and
   a shunt member consisting essentially of metal, wherein the shunt member is coupled to the at least two electrodes and connected in parallel with the read sensor and structured to decrease a resistance of the read sensor.

16. The transducer of claim 15, wherein the shunt member is a single layer.

17. The transducer of claim 15, wherein the read sensor is a tunneling magnetoresistive sensor.

18. The transducer of claim 17, wherein tunneling magnetoresistive sensor has a plurality of layers, the plurality of layers including a free layer, a barrier layer, a synthetic anti-ferromagnet layer, and an antiferromagnetic layer.

19. The transducer of claim 15, wherein the shunt member has a resistance greater than 200 ohms.

* * * * *